United States Patent [19]

Fortin

[11] Patent Number: 4,809,775
[45] Date of Patent: Mar. 7, 1989

[54] I-T-H PIPE CUTTING TOOL
[75] Inventor: Roland Fortin, Sudbury, Canada
[73] Assignee: INCO Limited, Toronto, Canada
[21] Appl. No.: 177,432
[22] Filed: Apr. 4, 1988
[30] Foreign Application Priority Data Apr. 23, 1987 [CA] Canada ................... 535380

[51] Int. Cl.[4] ........................................ E21B 29/00
[52] U.S. Cl. ........................................ 166/55.7; 30/108;
83/184; 83/187; 83/676; 166/55.8
[58] Field of Search ............... 166/55.7, 55.8, 55.2;
175/267, 263, 284; 30/103, 104, 108; 83/178,
184, 187, 490, 676, 483

[56] References Cited

U.S. PATENT DOCUMENTS

| 514,985 | 2/1894 | Albert et al. | 30/108 |
|---|---|---|---|
| 669,983 | 3/1901 | Ewest | 30/108 |
| 1,088,135 | 2/1914 | Fagan | 166/55.7 |
| 1,392,192 | 9/1921 | Miller | 166/55.7 |
| 2,534,858 | 12/1950 | Ellis | 166/55.7 |
| 2,942,092 | 6/1960 | Cammann | 166/55.7 X |
| 4,220,201 | 9/1980 | Hauk | 30/103 X |
| 4,307,512 | 12/1981 | Phillips | 30/103 X |
| 4,524,511 | 6/1985 | Montiero | 30/108 |
| 4,574,672 | 3/1986 | Ehm et al. | 83/471.2 |
| 4,601,223 | 7/1986 | Choby | 166/55.7 X |
| 4,701,988 | 10/1987 | Wood | 166/55.8 X |

FOREIGN PATENT DOCUMENTS

| 342498 | 10/1921 | Fed. Rep. of Germany | 166/55.7 |
|---|---|---|---|
| 1136956 | 9/1962 | Fed. Rep. of Germany | 166/55.7 |
| 0605934 | 5/1978 | U.S.S.R. | 166/55.7 |

Primary Examiner—Stephen J. Novosad
Attorney, Agent, or Firm—Raymond J. Kenny; Edward A. Steen

[57] ABSTRACT

A pipe cutting tool especially adapted to cut the interior of in-the-hole (I-T-H) drill pipe to allow subsequent removal of the pipe above the cut. Due to blasting damage, long sections of I-T-H pipe, otherwise in good condition, cannot be removed because the damaged section prevents the removal of the entire drill string. The tool is adapted to receive power from an external source and includes a frame, a pivoted motor and cutter, and an actuator for pivoting the motor.

11 Claims, 1 Drawing Sheet

I-T-H PIPE CUTTING TOOL

TECHNICAL FIELD

The instant invention relates to drilling in general and more particularly to an apparatus adapted to retrieve valuable in-the-hole ("I-T-H") drill string components otherwise normally left abandoned in a hole.

BACKGROUND ART

As a result of blasting operations, I-T-H drill string components (usually pipe) are frequently damaged and, as a consequence, become stuck in the drill hole. Depending on the length of the pipe, considerable economic losses may be experienced when the entire drill string cannot be retrieved simply because a small portion has become stuck. It is difficult and sometimes impossible to uncouple drill pipe joints above the damaged section at any appreciable depth. Assignee looses several $100,000 a year in abandoned but otherwise good drill pipe.

There have been attempts to wrestle with this problem. Pipe cutters and perforators of various descriptions have been devised. Principally, a cutter of some description is utilized. Although perhaps effective for conventional pipe cutting operations and on the surface, they are unwieldily when applied to I-T-H pipe and inapplicable at great depths.

Representative designs may be found in U.S. Pat. Nos. 514,985; 669,983; 1,088,135; 4,220,201; 4,307,512; 4,527,511; 4,574,672; German Auslegeschrift No. 1,136,956; German Patentschrift No. 342,498 and Russian No. 605,934.

Clearly an apparatus especially addressed to the unique demands of the retrieval of non-damaged I-T-H pipe is desirable.

SUMMARY OF THE INVENTION

Accordingly, there is provided a remotely operated compact cutting tool adapted for deep insertion into I-T-H drill rod. The tool having a hinged rotary motor and associated cutting disc is fed into the pipe string to a predetermined depth at which point the motor is activated and pitched toward the interior surface of the pipe. The cutting disc proceeds to cut the pipe and permits the removal thereof.

PREFERRED MODE FOR CARRYING OUT THE INVENTION

Figure 1:
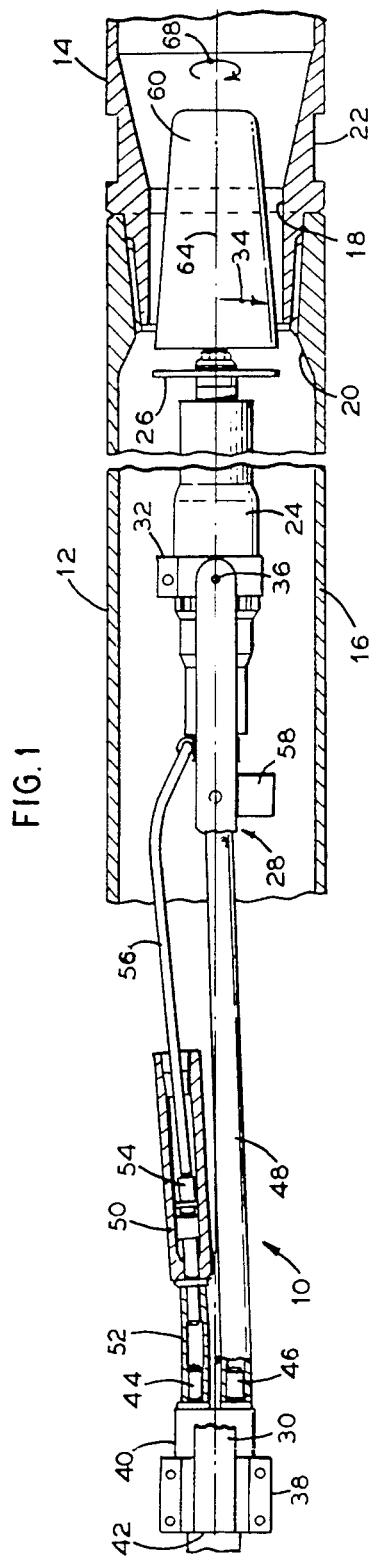
FIG. 1 is an elevation of an embodiment of the invention in partial cross section.
Figure 2:
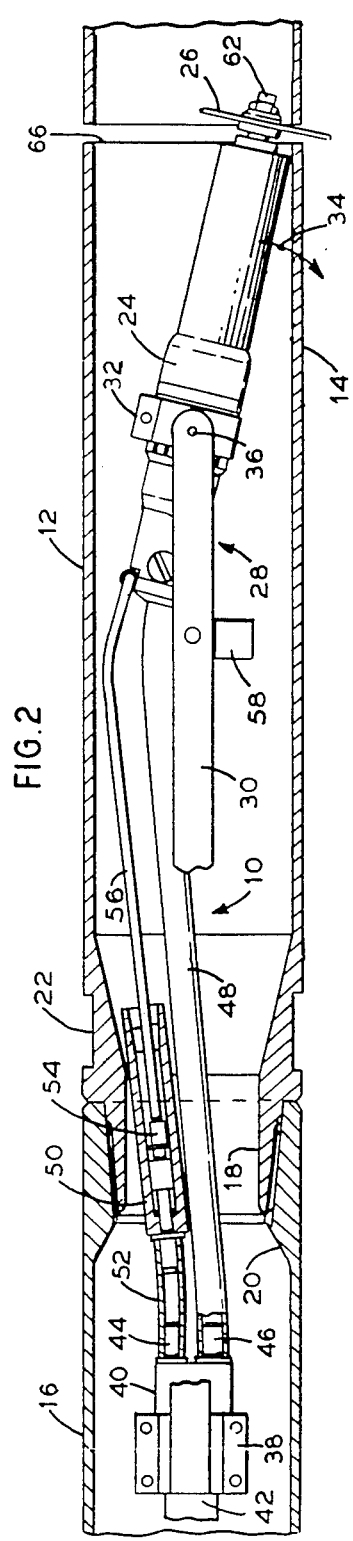
FIG. 2 is similar to the view shown in FIG. 1.

Referring to FIG. 1 and FIG. 2, there is shown pipe cutting tool 10 disposed within an I-T-H drill string 12. Although the ensuing discussing relates primarily to drilling applications, it will be appreciated that the instant invention may be utilized for other tube cutting applications as well.

FIG. 1 depicts the tool 10 as it is being inserted into the drill string 12 whereas FIG. 2 shows the tool 10 after pipe 14, comprising a portion of the drill string 12, has been cut.

The drill string 12, as depicted, includes pipes 14 and 16. The union between the two pipes, as per conventional drilling practice, is accomplished by pin end 18 threadably engaging box end 20. Depression 22 represents a wrenching slot. Assume for the ensuing discussion that a portion of the drill string 12 is damaged downstream the pipe 14 and it is necessary to cut the pipe 14 in order to free the remaining upstream undamaged portions of the drill string.

The cutter 10 is preferably pneumatically driven to take advantage of the commonly available pneumatic sources of supply that are ubiquitous in surface and underground excavations. The cutter 10 includes a high speed motor 24 of relatively small dimension. Favorable results have been experienced with a Cleco (trademark) pencil grinder model 15GEL180WC. It rotates up to about 18,000 revolutions per minute, operates up to 90 pounds per square inch gauge (621 kPa), and generates about 1.0 housepower (746 watts). Attached to the hub 62 of the motor 24 is a cutting disc 26, preferably made from Carborundum (trademark) abrasive or any similar material suitable for cutting metal pipe.

The motor 24 is enclosed in an open box frame 28 formed by two parallel side brackets 30 (only one is shown). Reference numeral 64 represents the axis of symmetry of both the tool 10 and the drill string 12. The motor 24 is pivotally mounted at the distal portion of the frame 28 via collar 32. The collar 32 is designed to rotate through arc 34 about pivot 36. The proximal section of the box frame 28 is formed by second collar 38. A stop 58 extends from the box frame 28.

Pneumatic power is supplied to the tool 10 from a conventional source (not shown) at dividing connection 40. High pressure air enters the connection 40 at entrance port 42 and is divided internally into two paths to flow out of exit ports 44 and 46. The exit port 46 supplies, via conduit 48, air pressure to the motor 24.

Air exiting the exit port 44 is fed into cylinder 50 by conduit 52. The cylinder 50 includes a piston 54, registered to activator 56. The activator 56 is attached to the rear of the motor 24 and, in the embodiment shown, has a slight bend. The piston 54 may be canted slightly away from the axis of symmetry 64 to accommodate the bend in the activator 56.

A frusto-conical centralizer 60, releasably affixed to the hub 62 of the motor 24, permits the tool 10 to be fished down the drill string 12 through the various unions to a predetermined depth.

The invention and manner of applying it may be better understood by a brief discussion of the principles underlying the invention.

Upon the determination that a portion of the drill string is damaged and it is desired to remove the string components above the damaged section, the tool 10 is inserted into the string until the cutting disc 26 reaches the desired depth. Initially, the centralizer 60 is affixed to the hub 62 so as to allow the tool to pass through the couplings in the string. Upon hitting an obstruction, the frusto-conical shape of the centralizer 60 will cause the motor 24 to slightly pivot out of the way of the obstruction and continue to guide the tool 10 to the desired location. The centralizer 60 is securely, but not permanently, affixed to the hub 62 so that upon activation of the motor 24, the rotation of the hub 62 will throw off the expendable centralizer 60 into the pipe 14.

FIG. 1 shows the tool 10 essentially in a neutral or straight position for passage through the string 12 components. A relatively rigid air supply conduit (not shown) communicating with a pneumatic supply source such as a pump and control valve is connected to the entrance port 42. The combination of the rigidity of the air supply and the centering action of the centralizer 60 permit the tool 10 to be guided to the desired depth.

For the sake of convenience, movement to the right in the Figures indicates greater bore depth whereas movement to the left indicates closer proximity to the surface.

Upon attainment of the desired depth, pressurized air is introduced into the connection 40. Air passing through the conduit 48 will activate the motor 24 causing the cutting disc 26 to rotate and the disposal of the centralizer 60. Simultaneously, the air passing into the cylinder 50 via conduit 52 will cause the piston 54 to extend thereby pushing the activator 56. By virtue of the curved geometry of the activator 56, the motor 24 is caused to rotate about the pivot 36 through the arc 34 and bring the cutting disc 26 into contact with the pipe 14. As long as the pressurized air is supplied to the tool 10, the motor 24 will assume the cutting position against the pipe 14. See FIG. 2. Simultaneously, the tool 10 is slowly rotated 68 by means, not shown, about the axis of symmetry 64 to allow the cutting disc 26 to travel about the interior diameter of the pipe 14.

In a sense, initiation or deletion of the air supply to the components may be likened to a signal as well as a source of power. That is, when the air supply is turned on, the air will signal the motor 24 and piston 54 to initiate movement.

After the pipe 14 has been cut along line 66, the air pressure source is shut off. Due to weight and the mounted bias orientation of the motor 24 within the box frame 28, the motor 24 will essentially return to its neutral, straight position coincident with the axis of symmetry 64 within the pipe 14 so as to enable it to be removed without any difficulty. The stop 58 prevents the tool 10 from pivoting too extensively in the opposite direction. In the event that the tool 10 is utilized in a direction other than down, a spring (not shown) may be employed to bias the motor 24 in the neutral, straight position.

Although pressurized air is the preferable power supply, it shall be apparent that the tool 10 may be alternatively powered and signalled by electrical or hydraulic means. Instead of the air motor 24, an electric or hydraulic motor may be utilized. Similarly, the air cylinder 50 may be replaced with a hydraulic cylinder or electrical servomotor and the appropriate controls. However, for most applications and especially for I-T-H applications, pneumatic power is preferred since it is relatively easy to harness and supply.

In any event, after the pipe 14 is cut above the damaged section, the remainder of the drill string 12 may be removed by conventional means and methods, such as a jack, etc.

Prototype designs incorporating the instant invention have helped retrieve about $182,000 of I-T-H drill pipe annually. This represents a large cost savings and the retrieval of an otherwise wasted resource.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

1. A pipe cutting tool, the tool adapted for insertion into a pipe, the tool comprising a support frame, the support frame having a proximal end and a distal end, a motor pivotally disposed within the support frame at the distal end, a cutting member affixed to the motor, an activator affixed to the motor for pivoting the motor and cutting member through a predetermined arc, the activator driven by a piston, and means for energizing the motor.

2. The tool according to claim 1 wherein the activator includes a rod affixed to the motor and the piston.

3. The tool according to claim 2 wherein the rod is bent so as to pivot the motor.

4. The tool according to claim 1 wherein pneumatic fluid reciprocates the piston.

5. The tool according to claim 1 wherein pneumatic fluid energizes the motor.

6. The tool according to claim 1 including a power supply source, the power supply source connected to the piston and the motor.

7. The tool according to claim 1 wherein the piston is disposed within the frame.

8. The tool according to claim 1 wherein a disposable centralizer is affixed to the motor.

9. The tool according to claim 6 wherein a flexible conduit is connected to the motor and the power supply source.

10. The tool according to claim 1 wherein the support frame is an open box having two parallel side brackets housing the components of the tool.

11. The tool according to claim 1 including a pneumatic fluid dividing connection attached to the support frame, the connection connectible to a single external source of fluid power and to the piston and motor.

* * * * *